United States Patent [19]

Furuya et al.

[11] Patent Number: 5,794,083
[45] Date of Patent: Aug. 11, 1998

[54] VISUAL LINE DETECTION CAMERA AND METHOD

[75] Inventors: Mikihito Furuya; Shigemasa Sato, both of Kanagawa-ken, Japan

[73] Assignee: Nikon Corporation, Tokyo, Japan

[21] Appl. No.: 769,267

[22] Filed: Dec. 18, 1996

Related U.S. Application Data

[63] Continuation of Ser. No. 372,973, Jan. 17, 1995, abandoned.

[30] Foreign Application Priority Data

Jan. 20, 1994 [JP] Japan .................................. 6-019975

[51] Int. Cl.$^6$ .................................................. G03B 3/00
[52] U.S. Cl. .................................................. 396/89
[58] Field of Search .............................. 396/89, 91, 92, 396/111, 121, 123

[56] References Cited

U.S. PATENT DOCUMENTS 4,950,069  8/1990  Hutchinson .
5,335,035  8/1994  Maeda .................................. 354/219
5,402,199  3/1995  Akashi .................................. 354/410
5,422,700  6/1995  Suda et al. .......................... 354/402
5,455,654  10/1995  Suzuki .................................. 354/402

*Primary Examiner*—Daniel P. Malley
*Attorney, Agent, or Firm*—Oliff & Berridge PLC

[57] ABSTRACT

A visual line detection camera includes a detector to detect the visual line position of a photographer, an area determination device to determine the fixation area using an equation containing compensation terms unique to the photographer in conjunction with the results of detection accomplished by the detector, a display to display the area corresponding to the fixation area obtained by the area determination device, a fixation area selector enabling the fixation area to be altered by external operation, and a compensating factor adjustment device to alter the compensation terms in the equation when the area determined by the equation and the fixation area after alteration are different as a result of alteration by the fixation area selector. This structure enables the camera to adapt to different photographers in accordance with different photographer physical attributes, providing a visual line detection camera with a high degree of reliability.

20 Claims, 4 Drawing Sheets

VISUAL LINE DETECTION CAMERA AND METHOD

This is a continuation of application Ser. No. 08/372,973 filed Jan. 17, 1995 now abandoned.

BACKGROUND OF THE INVENTION

1. Field of the Invention

The present invention concerns a visual line detection camera that controls the operation of a camera by detecting the position of the visual line within the photographic field.

2. Description of Related Art

Heretofore, various visual line detection cameras have been suggested, wherein the cameras are provided with a multiplicity of distance measuring areas to detect the position in the photographic field upon which a photographer is fixing his vision. One such camera detects the visual line using the reflected image of an eyeball obtained by illuminating the eyeball of the photographer.

In general, the direction of the visual axis and the direction of the point of fixation differ slightly, especially with regard to different individuals. Therefore, calibration is executed before picture taking by which each photographer inputs a compensation value. At the time of the actual picture taking, a visual line is determined after the selection of the compensation value for the photographer, the camera being focused automatically on the area selected by the visual line, and a picture is taken.

However, in the conventional art, depending upon the circumstances, a correct compensation value is not necessarily registered during calibration, resulting, during actual photography, in the selection of a different area than the area chosen by the visual line of the photographer. In such cases, visual line input is performed again. If the area is not selected correctly after re-input, either another calibration is accomplished or selection must be accomplished manually. Such problems cause dissatisfaction in visual line input.

SUMMARY OF THE INVENTION

Considering such conditions, embodiments of the present invention provide a visual line detection camera with a high degree of reliability.

In a visual line detection camera having the above structure, the compensation term in an equation of an area determination device is changed when the area of fixation obtained by the area determination device is different from the fixation area after a change by an alteration device. Hence, the accuracy of the subsequent visual line input is improved, making it possible to provide a visual line detection camera with a high degree of reliability.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

A detailed description of an embodiment of the present invention is described hereafter, with reference to the drawings.

Figure 1:
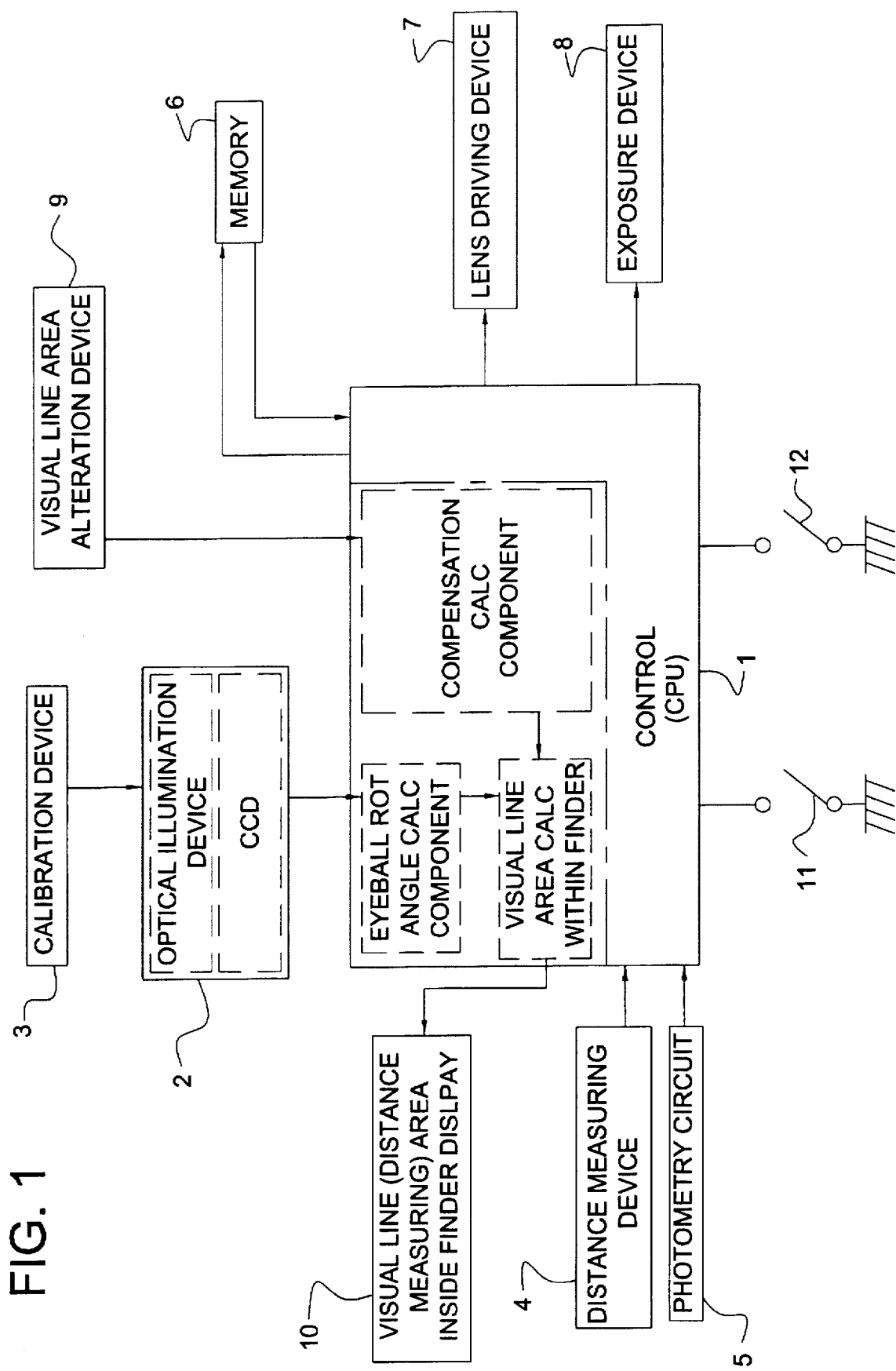
FIG. 1 is a block diagram showing an embodiment of the visual line detection camera of the present invention.

FIG. 1 is a block diagram describing an embodiment of a visual line detection camera according to the present invention.

In FIG. 1, 2 is a visual line detection device; 3 is a calibration device, which is executed prior to photography in the visual line detection device 2; and 1 is a control device, such as, for example, a CPU, comprising an eyeball rotation angle computation component, a visual line area inside the viewfinder computation component that computes the fixation area based on the eyeball rotation angle computed, a compensation computation processing component, a photometry computation processing component, and a distance measurement computation processing component. Information from the visual line detection device 2, the distance measuring device 4, and the photometry computation processing component is entered into the control device 1 via an interface. Each piece of information computed and processed by the control device 1 drives a lens driving device 7 and an exposure device 8 such as a diaphragm shutter via the interface. The results of the computation are stored in memory 6 and are displayed on the visual line area inside the viewfinder display 10.

In the event that an area entered by the photographer through a visual line input device and the area determined by the visual line detection device 2 are different, a change can be made by the visual line area (or fixation area) correction (or alteration) device 9. A compensation value determined by the calibration device 3 prior to photography is stored in the memory 6. According to an embodiment of the invention, the calibration compensation value stored in the memory 6 is corrected to satisfy the altered conditions by the visual line area alteration device 9, the corrected calibration compensation value replacing the old value in the memory 6.

Signals of a first switch (half-depression switch) 11 and a second switch (full-depression switch) 12 from a relay switch are entered into the control device 1. When the photographer operates these switches, the picture taking operation begins.

When detection of the visual line is accomplished using a reflected image (i.e., the Purkinje image) of an eyeball, obtained through the illumination of the photographer's eyeball surface, there is, in general, a deviation between the direction of the visual axis and the point of fixation. Because the deviation and the curvature of the cornea differ from individual to individual, it becomes necessary to execute calibration to accurately detect the visual line. In general, the rotational angle $\Theta$ of the eyeball ($\pm 10°$–$15°$) is directly proportional to the displacement×(around$\pm 1$ mm) of the Purkinje image. The relationship between the two is represented by a graph in FIG. 4.

When calibration is executed at two points (i) and (ii) within a viewfinder (the visual line area inside the viewfinder display 10), the angles of rotation of the eyeball to correct the vision on (i) and (ii) measured from the central area (iii) are determined mechanically and are stored in memory 6.

Figure 4:
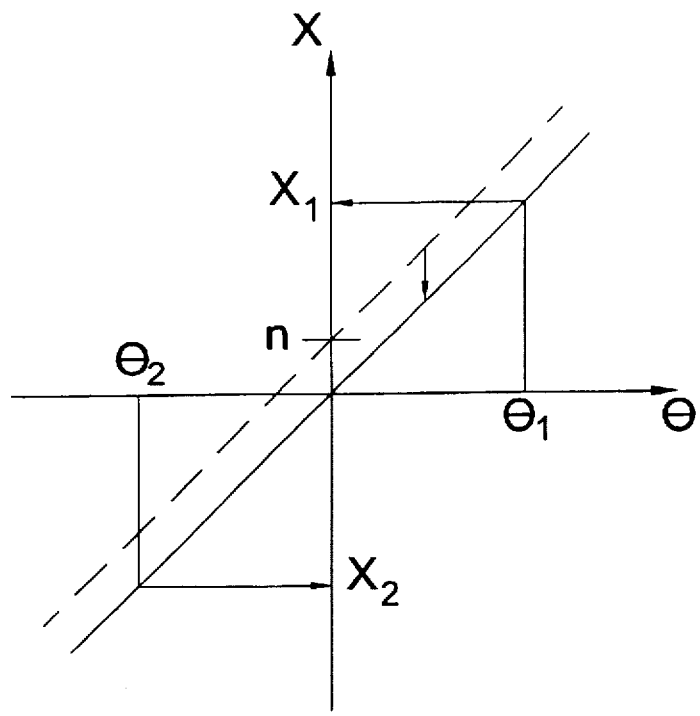
FIG. 4 is a characteristic diagram showing an embodiment of the visual line detection camera of the present invention.

To begin with, the photographer's vision is fixed on (i) to determine point A by taking the amount of displacement of the Purkinje image with respect to the angle of rotation Θ1 of the eyeball (FIG. 4). Then the photographer's vision is fixed on (ii) to determine point B by taking double the amount of displacement of the Purkinje image with respect to the angle of rotation Θ2 of the eyeball. Connecting points A and B, a graph as shown by the solid line in FIG. 4 is obtained. Assuming that the amount of Purkinje image displacement is measured from the origin, which is the center of the pupil of the eye, the graph becomes a straight line passing through the origin as shown in FIG. 4 with the solid line.

In reality, because the deviation between the direction of the visual axis and the fixation area, as well as the curvature of the cornea, differs from photographer to photographer, the graph is more like the dotted line in FIG. 4, in which the equation of the dotted line gives the direction Y of fixation:

$$Y = mx + n \qquad \ldots (1)$$

where m is the curvature constant of the cornea, and n is equivalent to the deviation between the direction of the visual axis and that of the fixation point. Thus the direction of fixation is determined by the sum of compensation factors mx and n. When the photographer's vision is fixed on the center, the angle of rotation Θ of the eyeball is 0. Substituting x=0 in the equation (1), Y=n is obtained. This is the constant equivalent to the deviation between the direction of the visual axis and the fixation point. Moreover, m is the curvature constant of the cornea. By executing calibration in such a way as to adjust the deviation n so that the line passes through the origin, the direction of the visual axis and that of the fixation point can be considered the same thereafter. By storing the values of constants m and n in memory 6, further visual detection will be automatically calibrated. In the present embodiment, calibrations are performed at points (i) and (ii), but any other points can be used equally well. However, for improved accuracy, the points should be chosen to make Θ as large as possible within the possible range for angles of rotation.

Next, the method of altering the distance measurement area in FIGS. 3(a), (b) and (c) will be explained.

The photographer fixes the visual line on the area (i) in the viewfinder (FIG. 3 (a)). When the visual detection camera decides that the photographer's vision is fixed on the area (ii) upon the half-depression of a release button (switch 11), the area (ii) is illuminated, for example (FIG. 3 (b)). The photographer, realizing that an area has been selected that is different from the area on which his vision is fixed, executes operations to change the area displayed by changing the illumination from (ii) to (i) using the visual line area alteration device (FIG. 3 (c)), which can be for example, a button or switch on the camera that can be operated to change the area illuminated (or otherwise identified) in the viewfinder. It will be helpful for the photographer if the display of (i) after alteration is made to differ from the initial display of (ii).

Figure 2:
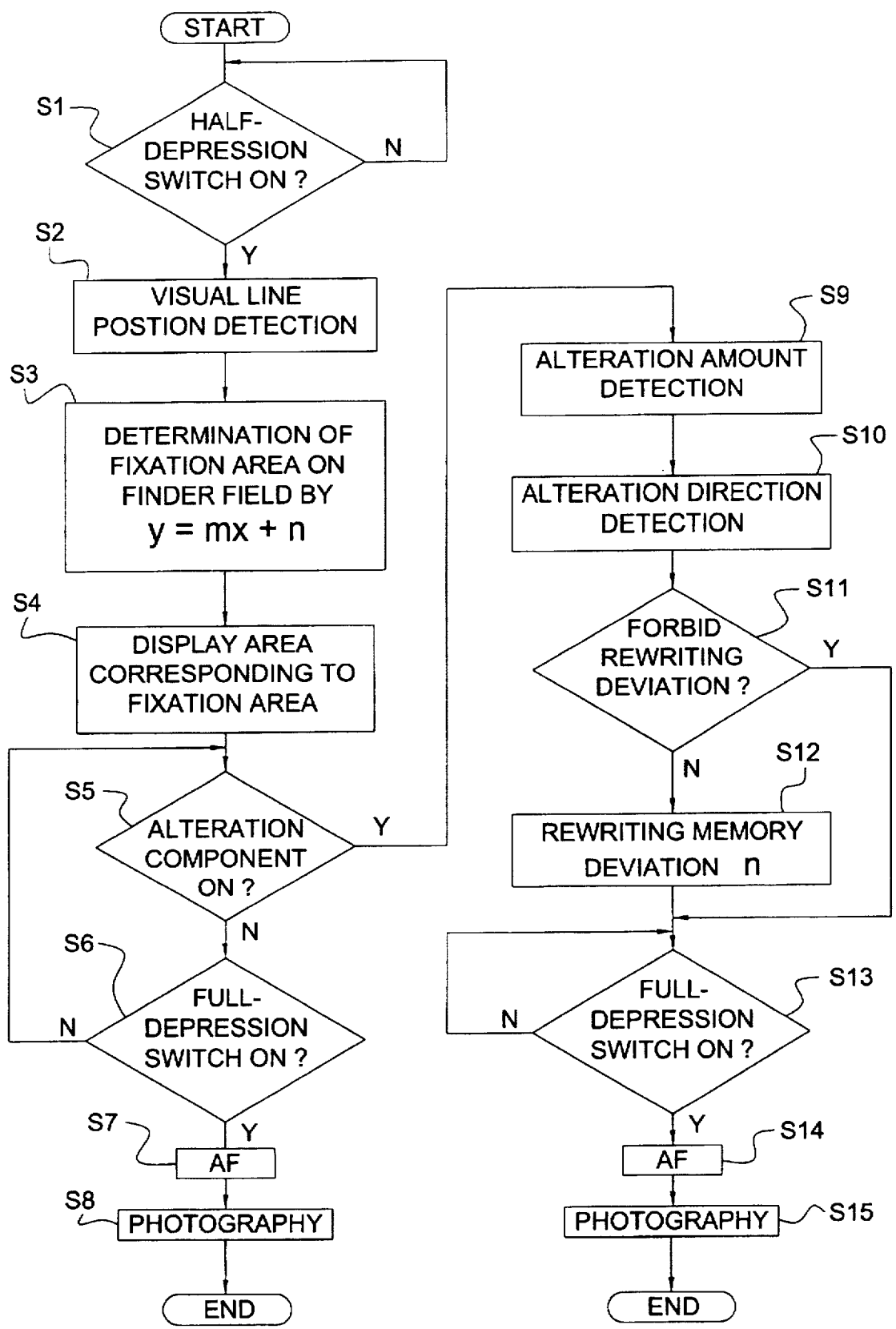
FIG. 2 is a flowchart explaining an embodiment of the visual line detection camera according to the present invention.
Figure 3A:
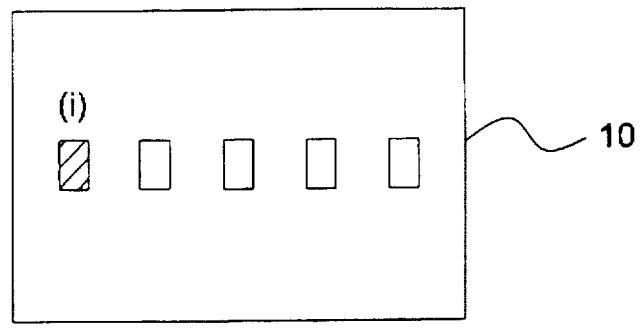
FIGS. 3(a), 3(b) and 3(c) are front views showing an embodiment of the visual line detection camera of the present invention.
Figure 3B:
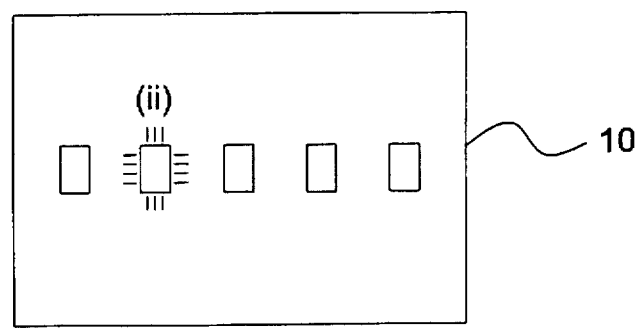
Figure 3C:
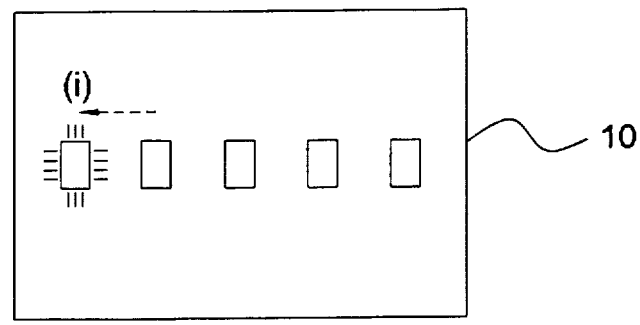

FIG. 2 is an illustration of a visual line detection camera that has the multiple distance measuring areas presented in FIGS. 3(a)–3(c) for which calibrations are performed individually using calibration device 3.

The control device 1 detects the position of the visual line (step S2) as soon as the switch 11 is half-depressed (step S1). Using the visual line detection device 2, the control device 1 determines the area of fixation in the viewfinder field using equation (1) (step S3) and illuminates (or otherwise displays) the fixation area in the visual line area inside the viewfinder display 10 (step S4). The control device 1 then decides whether the area the photographer attempted to visual-line input is the same as the fixation area determined by the visual line detection device 2 (step S5). If they are the same, full-depression of the release button (switch 12) without any change (step S6), will result in the auto focus operation being performed in the fixation area (step S7), and photography will be completed (step S8).

If the area that the photographer attempts to visual-line input and the distance measurement area determined by the visual line detection device 2 are not the same, the photographer can move the fixation area, using the visual line or fixation area alteration device 9, to the area that the photographer attempted to visual-line input. The amount of alteration associated with this move is detected at step S9, while the alteration of direction is detected at step S10.

The control device 1 stores in memory 6 the amount and direction of alteration detected as the compensation deviation a (steps S11 and S12). In the operation of the visual line area alteration device 9, if the area is moved to the left as shown in FIG. 3(c), the compensation deviation α is added to the deviation n (calibration compensation value), while α is subtracted from n if the area moves to the right. The compensation deviation is the value that varies with the amount of movement by the visual line area alteration device 9, is detected by the visual line area alteration device 9, and is stored in memory 6 after computation by the control device 1. In the present embodiment, compensation is made for the deviation n for which the error is expected to be large, but the curvature constant of the cornea m can be compensated (i.e., altered) easily as well. Thus, the control device 1 operates as a compensation factor adjustment device.

The control device 1 proceeds to step S13 when there is no rewriting needed for the deviation rewriting selection device (e.g., when α=0) and stores the existing deviation n. Moreover, when rewriting is needed, the control device 1 stores the altered deviation n in memory 6, and auto focus operation (step S14) and photography (step S15) take place with altered deviation n. In this instance, the letter n is used to represent both deviations before and after the alteration for convenience in making a flowchart, but in reality n represents different values.

Incidentally, a deviation rewriting selection device can be omitted with the altered compensation values always stored in memory. Moreover, the values can be stored in memory 6 before the switch 12 is turned on, the above sequences being repeated each time a picture is taken.

Figure 5:
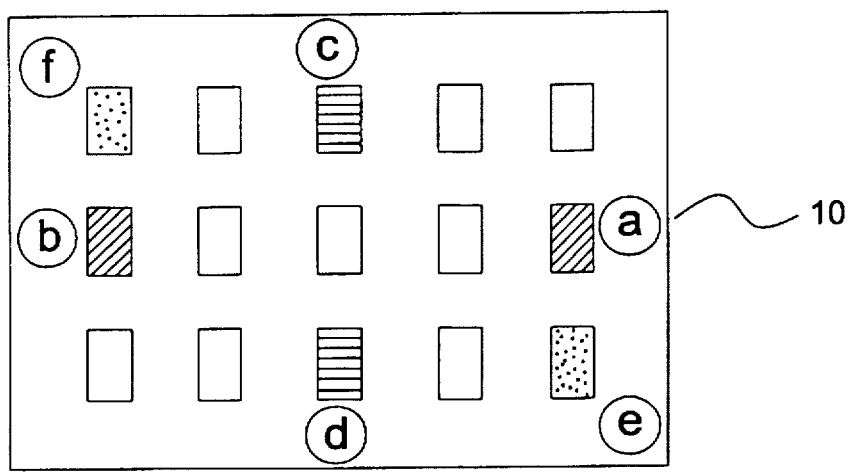
FIG. 5 is a front view showing an embodiment of the visual line detection camera according to the present invention.

As explained above, according to the present embodiment, five visual line input areas (distance measuring areas) lined in one direction shown in FIGS. 3(a)–3(c) are used as examples; however, the number is not limited by the example. Likewise, the number is not limited by the example of the visual line detection camera with two dimensional visual line input areas as shown in FIG. 5. In this case, a two dimensional visual line detection sensor is used to detect the amount of movement of the visual line. Calibration can be executed using two points (a) and (b) as representatives similar to the embodiment, or the average of two detections with two different directions (a) to (b), and (c) to (d) can be used. Or even points (e) and (f) in the oblique direction can be used to cover two directions. In any case, the compensation value alteration method to be followed by the visual line area alteration device 9 is the same.

While the embodiments disclosed herein are preferred, it will be appreciated from this specification that various alternatives, modifications, variations or improvements therein may be made by those skilled in the art that are within the scope of the invention, which is defined by the following claims.

What is claimed is:

1. A visual line detection camera, comprising:

a detector that detects a visual line position of a photographer;

an area determining device coupled with said detector, said area determining device determining a first area based on compensation factors and said visual line position detected by said detector;

a display coupled with said area determining device, said display displaying an area corresponding to said first area;

an area correction device coupled with said display, said area correction device enabling the first area to be selectively switched to a second area; and a compensation factor adjustment device coupled with said area correction device, said compensation factor adjustment device adjusting at least one of said compensation factors based on operation of said area correction device which selectively switches areas based upon reiterative correction values computed when said first area determined by said area determining device is different from said second area after a change by said area correction device.

2. The visual line detection camera according to claim 1, wherein said compensation factor adjustment device adjusts at least one of said compensation factors based on a difference in direction and distance between said second area and said first area.

3. The visual line detection camera according to claim 1, wherein said compensation factors comprise a compensation factor related to a cornea curvature of the photographer and a compensation factor related to a deviation between an eye visual axis direction and a direction of said first area.

4. The visual line detection camera according to claim 3, wherein said compensation factor adjustment device alters only said compensation factor related to said deviation.

5. The visual line detection camera according to claim 1, further comprising a calibration device, said calibration device determining said compensation factors prior to adjustment by said compensation factor adjustment device.

6. The visual line detection camera according to claim 5, further comprising a memory storing said compensation factors, wherein said memory is updated based on with said compensation factor adjustment device.

7. The visual line detection camera according to claim 1, wherein said display comprises a plurality of areas, said display illuminating an area corresponding to said first area.

8. The visual line detection camera according to claim 7, wherein when said first area is switched to said second area, said display illuminating said second area.

9. The visual line detection camera according to claim 1, wherein said compensation factor adjustment device comprises:

a distance alteration amount detecting device that detects an amount of distance alteration from said first area to said second area; and a direction alteration amount detecting device that detects an amount of direction alteration from said first area to said second area.

10. The visual line detection camera according to claim 9, wherein said compensation factor adjustment device adjusts said compensation factors in accordance with said distance alteration amount and said direction alteration amount.

11. A visual line detection camera, comprising:

means for determining a first area in accordance with compensation factors;

alteration means for enabling the first area to be selectively switched to an actual area; and compensation means for altering at least one of said compensation factors based on operation of said alteration means which selectively switches areas based upon reiterative correction values computed when said first area obtained by said area determining means is different from said actual area after a change by said alteration means.

12. A method of determining an area in a visual line detection camera, the method comprising:

detecting a visual line position of a photographer;

determining a first area based on compensation factors and said visual line position;

displaying an area corresponding to said first area;

enabling the first area to be selectively switched to a second area; and adjusting at least one of said compensation factors based on switching to said second area which selectively switches areas based upon reiterative correction values computed when an said first area determined by an area determining device is different from said second area after a change by an area correction device.

13. The method according to claim 12, wherein said adjusting step comprises adjusting said compensation factors based on a difference in direction and distance between said second area and said first area.

14. The method according to claim 12, wherein said compensation factors comprise a compensation factor related a cornea curvature of the photographer and a compensation factor related to a deviation between an eye visual axis direction and a direction of said first area.

15. The method according to claim 14, wherein said adjusting step comprises altering only said compensation factor related to said deviation.

16. The method according to claim 12, further comprising determining said compensation factors prior to said adjusting step.

17. The method according to claim 16, further comprising storing said compensation factors in a memory, and updating said memory based on said adjusting step.

18. The method according to claim 12, wherein said displaying step comprises illuminating an area of a plurality of areas corresponding to said first area.

19. The method according to claim 18, wherein when said first area is switched to said second area, the method comprising illuminating said second area.

20. The method according to claim 12, wherein said adjusting step comprises:

detecting distance alteration from said first area to said second area; and detecting direction alteration from said first area to said second area.

* * * * *